US012733585B2

(12) United States Patent
Kloker et al.

(10) Patent No.: US 12,733,585 B2
(45) Date of Patent: Sep. 15, 2026

(54) CHOPPING UNIT OF AN AGRICULTURAL HARVESTING MACHINE, CONTROL DEVICE AND METHOD FOR OPERATING THE CHOPPING UNIT

(71) Applicant: CLAAS Saulgau GmbH, Bad Saulgau (DE)

(72) Inventors: Philipp Kloker, Emeringen (DE); Josef Fischer, Biberach (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 399 days.

(21) Appl. No.: 18/451,018

(22) Filed: Aug. 16, 2023

(65) Prior Publication Data

US 2024/0065159 A1 Feb. 29, 2024

(30) Foreign Application Priority Data

Aug. 23, 2022 (DE) ......................... 102022121327.7

(51) Int. Cl.
*A01D 43/08* (2006.01)
*A01D 43/00* (2006.01)

(52) U.S. Cl.
CPC ........... *A01D 43/08* (2013.01); *A01D 43/006* (2013.01)

(58) Field of Classification Search
CPC ....... A01D 43/08; A01D 43/006; A01F 12/40; A01F 29/095; A01F 29/09
See application file for complete search history.

(56) References Cited

U.S. PATENT DOCUMENTS 3,139,717 A * 7/1964 Fischer .................. A01D 43/08 56/DIG. 1
3,419,055 A * 12/1968 Schwalm ............. A01F 29/095 83/699.61
3,431,712 A * 3/1969 Probsting ............... A01F 29/10 241/222
3,643,720 A * 2/1972 Sadler ..................... A01F 29/14 56/DIG. 1

(Continued)

FOREIGN PATENT DOCUMENTS

DE 1255379 B 11/1967
DE 2425372 A1 12/1974

(Continued)

OTHER PUBLICATIONS

German Patent Office Search Report; 6 pages; May 15, 2023/.

*Primary Examiner* — Arpad Fabian-Kovacs

(57) ABSTRACT

Chopping unit (5) of an agricultural harvesting machine (1), having a chopping drum (10) bearing chopping knives, a first roller pair (11) consisting of an upper and a lower press roller (15) and (16) positioned upstream of the chopping drum (10), at least one second roller pair (12) consisting of a pre-compression roller (13) and a transport roller (14) positioned upstream of the first roller pair (11), a counter-cutting device (18) cooperating with the chopping drum (10) and a stripper device (19) cooperating with the lower press roller (16), arranged between the lower press roller (16) and the chopping drum (10), wherein a rotary shaft (20) of the lower press roller (16) and/or a rotary shaft (21) of the transport roller (14) can be displaced in its relative position to a rotary shaft (17) of the chopping drum (10) at least in the vertical direction.

9 Claims, 4 Drawing Sheets

(56) References Cited

U.S. PATENT DOCUMENTS

| | | | | | |
|---|---|---|---|---|---|
| 3,851,450 | A * | 12/1974 | Nelson | A01F 29/06 | 56/14.4 |
| 4,747,260 | A * | 5/1988 | Petrasch | A01F 29/10 | 56/505 |
| 2007/0113533 | A1 * | 5/2007 | Schafer | A01F 29/10 | 56/16.4 R |

FOREIGN PATENT DOCUMENTS

| | | | | |
|---|---|---|---|---|
| DE | 3919055 | A1 | 12/1990 | |
| DE | 19651694 | A1 * | 6/1998 | A01F 29/095 |
| DE | 19652656 | A1 | 6/1998 | |
| DE | 102005055983 | A1 | 7/2007 | |
| DE | 102013004274 | A1 * | 9/2014 | A01D 43/08 |
| DE | 102015103923 | A1 | 9/2016 | |
| DE | 202016105163 | U1 | 10/2016 | |
| DE | 102016222167 | A1 * | 12/2017 | A01D 43/08 |
| DE | 102016214758 | A1 * | 2/2018 | A01F 29/095 |
| EP | 0177995 | A1 * | 4/1986 | A01F 29/06 |
| EP | 1151662 | A1 * | 11/2001 | A01F 29/095 |
| EP | 1797753 | A2 * | 6/2007 | A01F 29/10 |
| EP | 2489254 | A1 * | 8/2012 | A01F 29/10 |

* cited by examiner

CHOPPING UNIT OF AN AGRICULTURAL HARVESTING MACHINE, CONTROL DEVICE AND METHOD FOR OPERATING THE CHOPPING UNIT

The invention relates to a chopping unit of an agricultural harvesting machine and an agricultural harvesting machine. The invention further relates to a control device and a method for operating the chopping unit.

DE 10 2015 103 923 A1 discloses the basic construction of a chopping unit of a forage harvester. Thus the chopping unit disclosed therein has a chopping drum which bears a plurality of chopping knives. When viewed in the transport direction of the harvested crops, a first roller pair which comprises a press roller and a drum roller is positioned upstream of the chopping drum. At least one second roller pair consisting of a pre-compression roller and a transport roller is arranged upstream of this first roller pair in the transport direction. A counter-cutting device cooperates with the chopping drum.

DE 20 2016 105 163 U1 discloses a detail of a further chopping unit of a forage harvester. It is disclosed herein that a stripper device which cooperates with the drum roller is arranged between the drum roller and the chopping drum, in addition to the counter-cutting device. The counter-cutting device can be adjusted relative to the chopping drum.

DE 196 52 656 A1 and DE 39 19 055 A1 disclose further chopping units with counter-cutting devices which can be adjusted relative to the chopping drum.

As set forth above, when viewed in the transport direction of the harvested crops, at least two roller pairs are arranged upstream of the chopping drum, namely the first roller pair consisting of the upper press roller and the lower press roller, which is generally denoted as the drum roller, and the at least one second roller pair consisting of the pre-compression roller and the transport roller. The harvested crops are conveyed between the rollers of the roller pairs.

The thickness or the vertical height of the harvested crops conveyed between the rollers of the roller pairs or the conveyed harvested crop mat is also denoted as the mat height. Relative to a rotary shaft or a central point of the chopping drum, the mat height is divided into a portion positioned or running above the rotary shaft or above the central point of the chopping drum and into a portion positioned or running below the rotary shaft or below the central point of the chopping drum. The mat height as such and the division of the mat height into these two portions influences, on the one hand, the achievable throughput through the chopping unit and, on the other hand, the chopping quality of the chopped harvested crops.

Hitherto known chopping units have had only limited options for influencing the division of the mat height into the portion of the mat running or positioned above the rotary shaft or the central point of the chopping drum, and the portion of the mat running or positioned below the rotary shaft or the central point of the chopping drum.

Proceeding therefrom, the object of the present invention is to provide a novel chopping unit and a control device and a method for operating the chopping unit.

This object is achieved by a chopping unit according to claim 1. According to the invention, a rotary shaft of the lower press roller and/or a rotary shaft of the transport roller can be displaced in its relative position to a rotary shaft of the chopping drum at least in the vertical direction.

In the chopping unit according to the invention, the rotary shaft of the lower press roller and/or the rotary shaft of the transport roller can be displaced in its relative position to the rotary shaft of the chopping drum at least in the vertical direction. As a result, it is possible to influence actively the division of the mat height into the portion running above the rotary shaft or the central point of the chopping drum and the portion running below the rotary shaft or the central point of the chopping drum, and thereby to influence actively both the throughput through the chopping unit and also the chopping quality.

In a preferred embodiment, both the rotary shaft of the lower press roller and the rotary shaft of the transport roller can be displaced in its relative position to the rotary shaft of the chopping drum at least in the vertical direction and preferably also in the horizontal direction. However, it is also possible to displace exclusively the rotary shaft of the lower press roller or exclusively the rotary shaft of the transport roller in its relative position to the rotary shaft of the chopping drum at least in the vertical direction, preferably in the vertical direction and in the horizontal direction.

Preferably, the stripper device and/or the counter-cutting device and/or a stop for the upper press roller cooperating with the lower press roller can be displaced together with the lower press roller relative to the chopping drum. The displacement of the stripper device and/or the counter-cutting device and/or the stop for the upper press roller cooperating with the lower press roller, together with the lower press roller, relative to the chopping drum is particularly preferred in order to influence the throughput and the chopping quality via the division of the mat height.

Preferably, a stop for the respective pre-compression roller can be displaced together with the respective transport roller relative to the chopping drum. This also serves for advantageously influencing the throughput and the chopping quality as a function of the division of the mat height.

Preferably, the rotary shaft of the lower press roller and/or the rotary shaft of the transport roller can be displaced in its relative position to a rotary shaft of the chopping drum in the vertical direction perpendicular to the transport direction of the harvested crops and in the horizontal direction parallel to the transport direction of the harvested crops. When the rotary shaft of the lower press roller and/or the rotary shaft of the transport roller can be displaced both in the vertical direction perpendicular to the transport direction of the harvested crops and in the horizontal direction parallel to the transport direction of the harvested crops, it is particularly advantageously possible to divide the mat height into the portion positioned above the rotary shaft of the chopping drum and the portion positioned below the rotary shaft of the chopping drum, and thus to influence the throughput and the chopping quality.

The control device for operating the chopping unit is defined in claim 7. The control device for operating the chopping unit is defined in claim 9, Preferred developments of the invention are found in the dependent claims and the following description. Exemplary embodiments of the invention are explained in more detail by way of the drawing, without being limited thereto. In the drawing:

FIG. 1 shows an agricultural harvesting machine 1 which is configured as a forage harvester and which comprises a working assembly 2.

Figure 1:
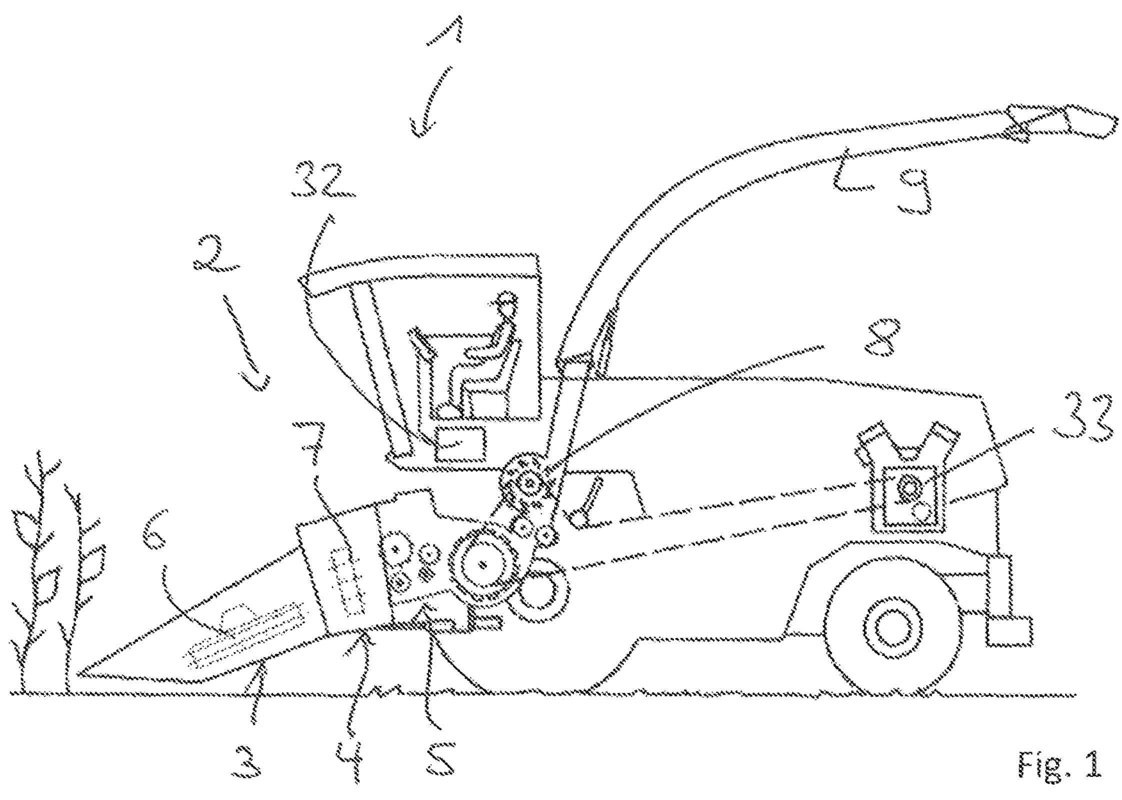
FIG. 1 shows an agricultural harvesting machine with a chopping unit.

The working assembly 2 is an attachment 3 configured as a maize header with a feed unit 4. Harvested crops to be harvested are separated from a subsoil to be cultivated by means of the mowing and conveying members 6 of the maize header 3 and supplied by feed drums 7 of the feed unit 4 via an intake unit to the chopping unit 5.

The harvested crops are shredded in the region of the chopping unit 5 and conveyed via a conveying device 8 arranged downstream of the chopping unit 5 in the direction of a discharge chute 9. The shredded harvested crops can be discharged via the discharge chute 9 in the direction of a transport vehicle.

The invention relates to the chopping unit 5 of the agricultural harvesting machine 1.

The chopping unit 5 has a chopping drum 10 which bears chopping knives, not shown in detail. When viewed in the transport direction of the harvested crops, a first roller pair 11 is arranged upstream of the chopping drum 10. At least one second roller pair 12 is positioned in the transport direction upstream of this first roller pair 11. These roller pairs 11, 12 form the intake unit of the forage harvester.

The first roller pair 11 has a lower press roller 16 and an upper press roller 15, wherein the upper press roller 15 is arranged above the lower press roller 16 when viewed in the vertical direction. The lower press roller 16 is often also denoted as the drum roller.

The respective second roller pair 12 has a pre-compression roller 13 and a transport roller 14, wherein the pre-compression roller 13 is arranged above the transport roller 14.

The spacing between the rollers of these roller pairs 11, 12, i.e. the vertical spacing between the upper press roller 15 and the lower press roller 16 and the vertical spacing between the pre-compression roller 13 and the transport roller 14, determines the vertical thickness of a harvested crop mat EM to be conveyed by the intake unit and the chopping unit 5, wherein this vertical thickness is also denoted as the mat height PH.

Figure 2:
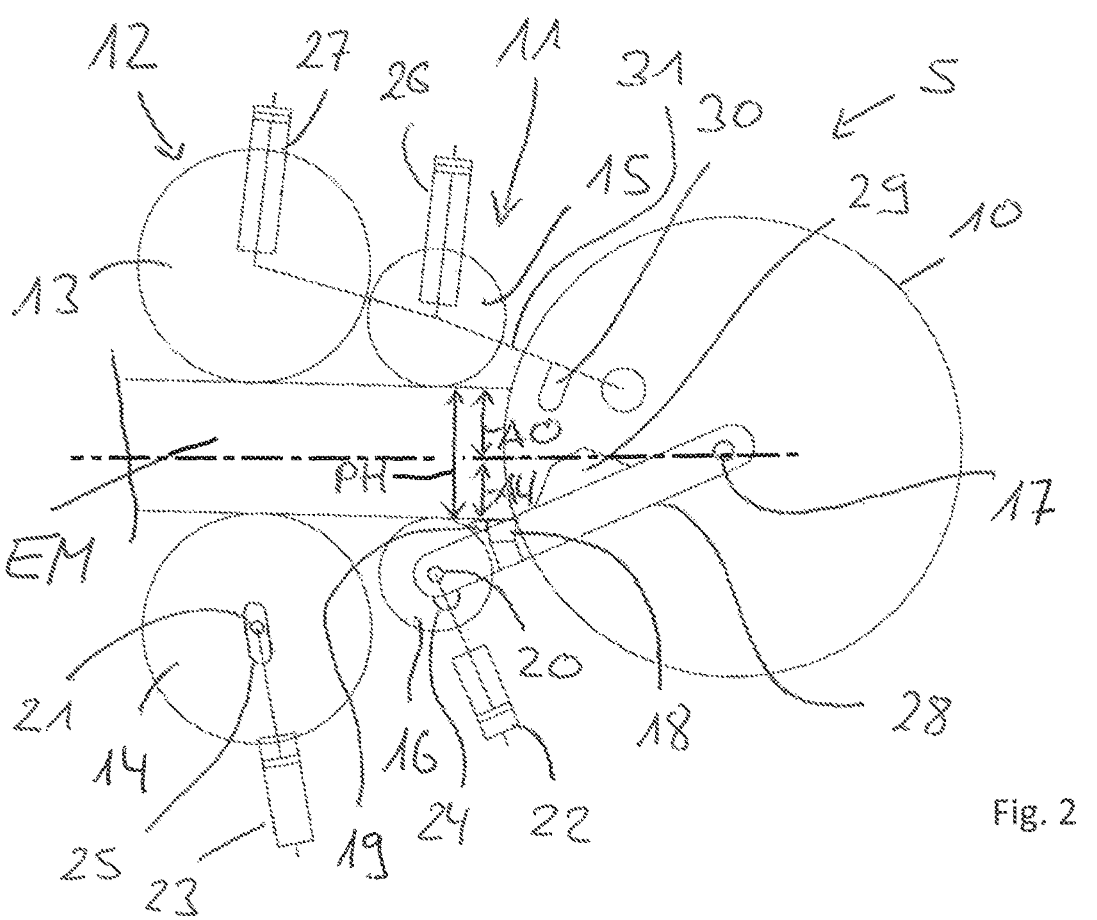
FIG. 2 show a schematic view of a chopping unit according to the invention.

FIG. 2 shows a rotary shaft 17 or a central point of the chopping drum 10, wherein the mat height PH of the harvested crop mat EM to be conveyed by the chopping unit 5 is divided into a portion AO positioned vertically above the central point or the rotary shaft 17 of the chopping drum 10 and a portion AU arranged below the central point or the rotary shaft 17 of the chopping drum 10.

FIG. 2 also shows a counter-cutting device 18 cooperating with the chopping drum 10 and a stripper device 19 cooperating with the lower press roller 16. The counter-cutting device 18 and the stripper device 19 are positioned between the lower press roller 16 and the chopping drum 10.

In order to influence actively the division of the mat height PH of the harvested crop mat EM into the two portions AO and AU and as a function thereof the throughput through the chopping unit 5 and/or the chopping quality of the chopping unit 5, the rotary shaft 20 of the lower press roller 16 arranged below the upper press roller 15 and/or the rotary shaft 21 of the respective transport roller 14 arranged below the respective pre-compression roller 13 can be displaced in its relative position to the rotary shaft 17 of the chopping drum 10 at least in the vertical direction.

The division of the mat height PH of the harvested crop mat EM into the portions AO and AU relative to the rotary shaft 17 or the central point of the chopping drum 10 can be advantageously influenced by means of the invention.

Figure 3:
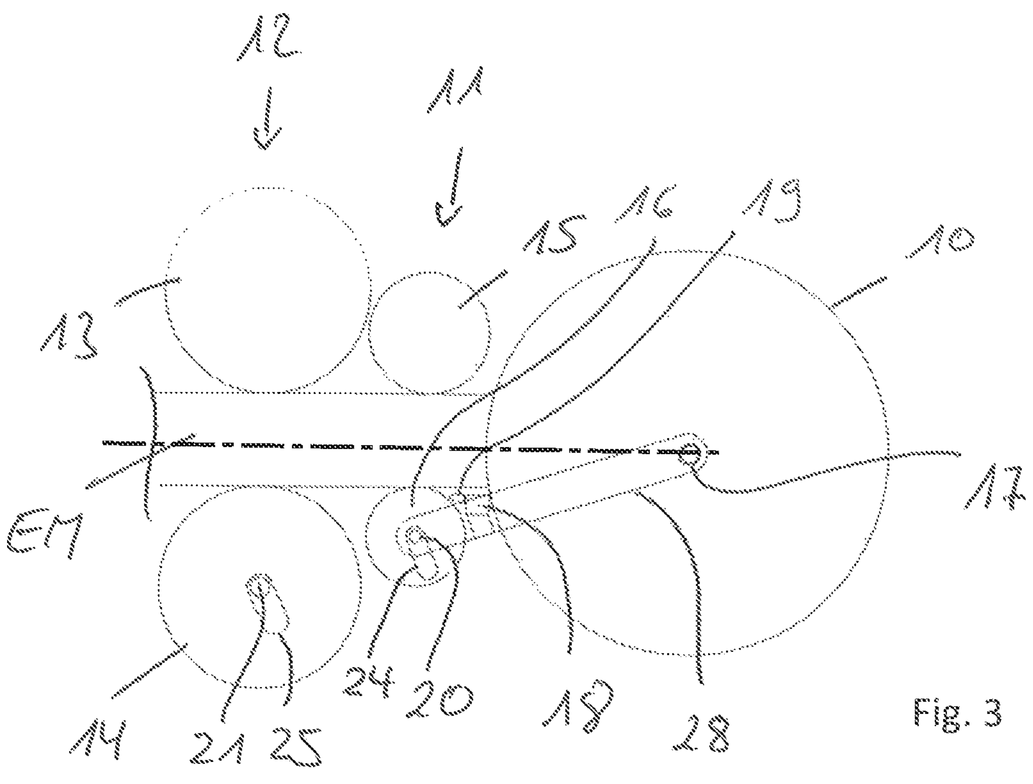
FIGS. 3, 4 show schematic views of the chopping unit according to the invention of FIG. 2 in two different states.
Figure 4:
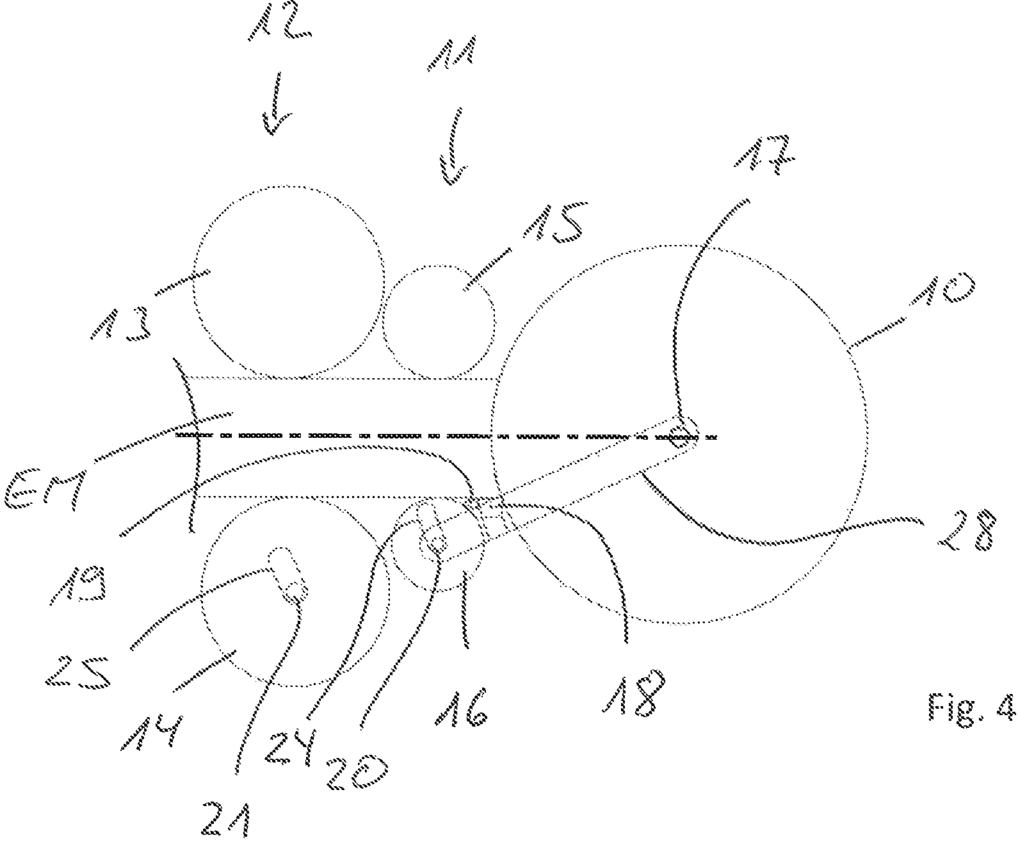

In the variant of FIGS. 2, 3 and 4, both the rotary shaft 20 of the lower press roller 16 and the rotary shaft 21 of the respective transport roller 14 can be displaced in their relative position to the rotary shaft 17 of the chopping drum 10 in the vertical direction and in the horizontal direction, in order to influence thereby the division of the mat height PH of the harvested crop mat EM into the two portions AO and AU.

According to FIG. 2 both the lower press roller 16 is assigned an actuator 22 and the transport roller 14 is assigned an actuator 23. Via the respective actuator 22, 23 the rotary shaft 20, 21 of the respective roller 16, 14 can be displaced relative to the rotary shaft 17 of the chopping unit 10 in the vertical direction and in the horizontal direction, namely within the limits which are predetermined by a slot 24, 25 and within which the respective rotary shaft 20, 21 can be displaced inside the respective slot 24, 25. The actuators 22, 23 can be pistons actuated by pressure medium, for example of hydraulic cylinders. Alternatively, spring elements with correspondingly adapted spring characteristic curves could be provided.

Moreover, FIG. 2 shows actuators 26, 27 which are assigned to the upper press roller 15 cooperating with the lower press roller 16 and to the pre-compression roller 13 cooperating with the transport roller 14. In order to provide a defined pressing force onto the harvested crop mat EM, these actuators 26, 27 press the upper press roller 15 in the direction of the lower press roller 16 and press the pre-compression roller 13 in the direction of the transport roller 14. The actuators 26, 27 can be spring elements or pistons actuated by pressure medium, for example of hydraulic cylinders.

In FIG. 2 the spacing between the rollers of the two roller pairs 11, 12 is greater than that in FIG. 3. Thus a larger mat height PH can be provided. In FIG. 4 the portion AU of the mat height PH of the harvested crop mat EM below the rotary shaft 17 of the chopping drum 10 is also greater than in FIG. 3.

In the exemplary embodiment of FIGS. 2, 3 and 4 both the stripper device 19 and the counter-cutting device 17 can be displaced together with the lower press roller 16 relative to the chopping drum 10. To this end, the lower press roller 16, the stripper device 19 and the counter-cutting device 18 are fastened to a common support arm 28 and are able to be displaced together via this support arm 28 relative to the chopping drum 10.

FIG. 2 also shows a stop 29 for the upper press roller 15 which defines the minimal spacing of the upper press roller 15 relative to the lower press roller 16. This stop 29 can also be displaced together with the lower press roller 16 via the support arm 28 relative to the chopping drum 10. The stop 29 cooperates with a counter-stop 30 which acts on a lever 31 on which the upper press roller 15 is mounted.

In FIG. 2 the two stops 29, 30 determine not only the minimum spacing between the upper press roller 15 and the lower press roller 16 but also the minimum spacing between the pre-compression roller 13 and the transport roller 14. However, a separate stop can also be present for the respective pre-compression roller 13. This roller can then in turn preferably be displaced together with the respective transport roller 14 relative to the chopping drum 10.

Figure 5:
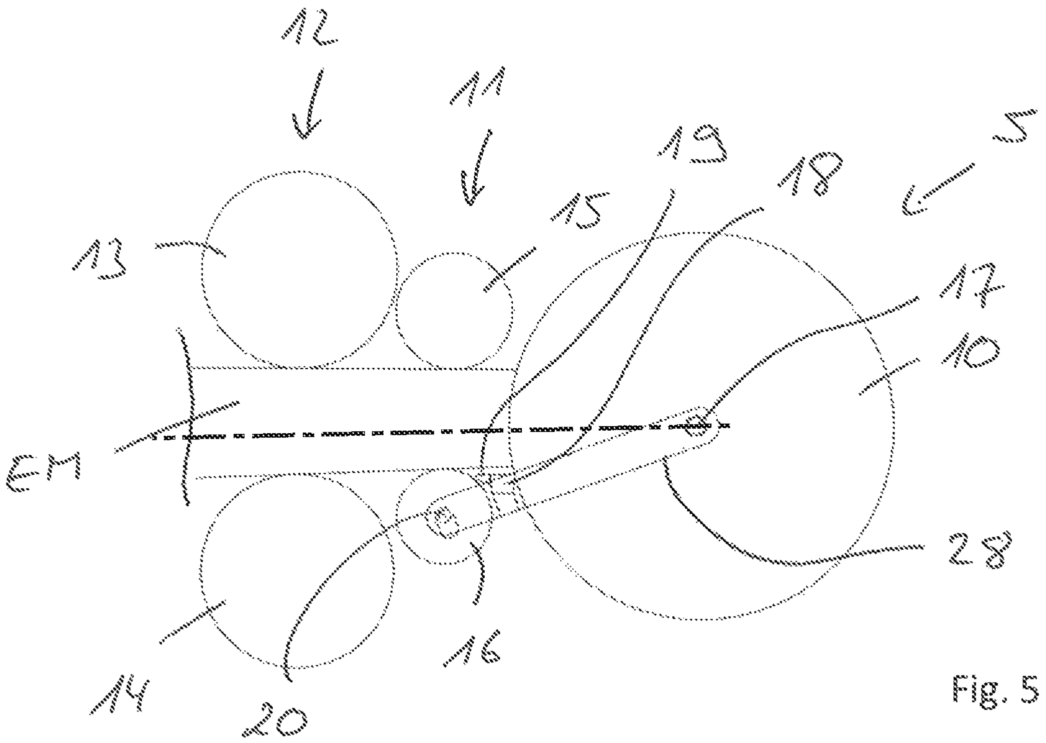
FIGS. 5, 6 show schematic views of a modification of the chopping unit according to the invention of FIG. 2 in two different states.
Figure 6:
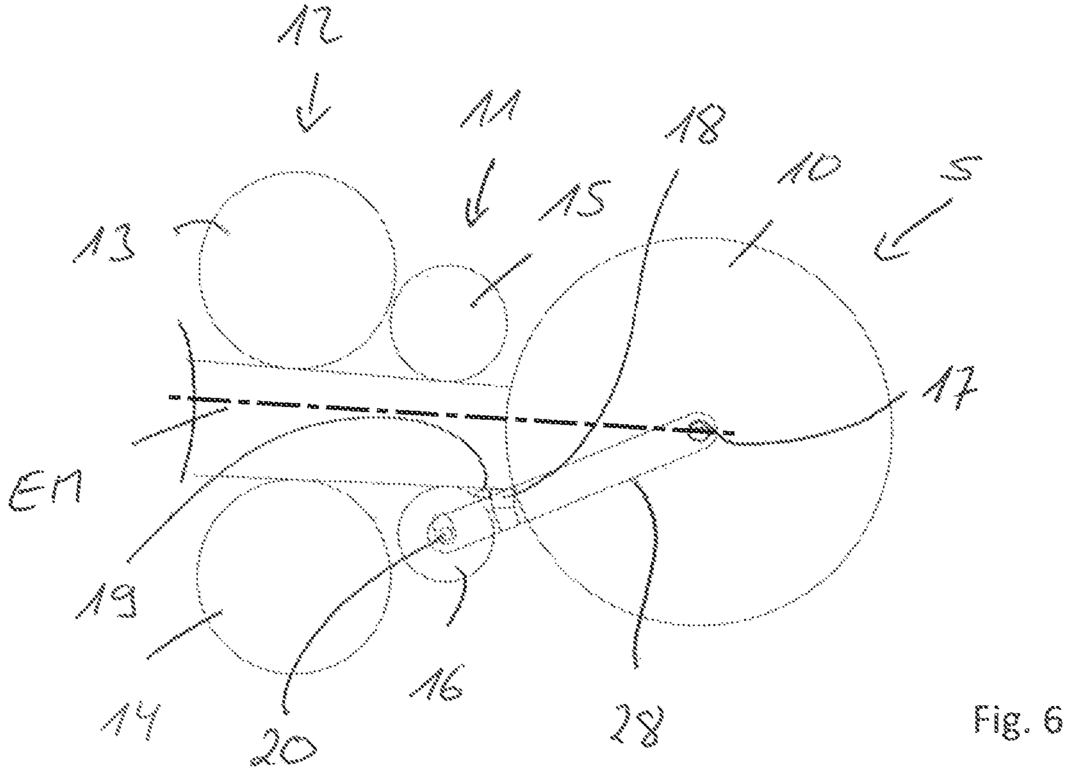

While in the exemplary embodiment of FIGS. 2, 3 and 4 both the rotary shaft of the lower press roller 16 and the rotary shaft of the transport roller 14 can be displaced in their relative position to the rotary shaft of the chopping drum 10 in the vertical direction and in the horizontal direction, FIGS. 5 and 6 show a modification of the chopping unit 5 in which the transport roller 14 is stationary and merely the rotary shaft 20 of the lower press roller 16 can be displaced in its relative position to the rotary shaft 17 of the chopping drum 10 at least in the vertical direction and preferably also in the horizontal direction.

Figures 7, 8:
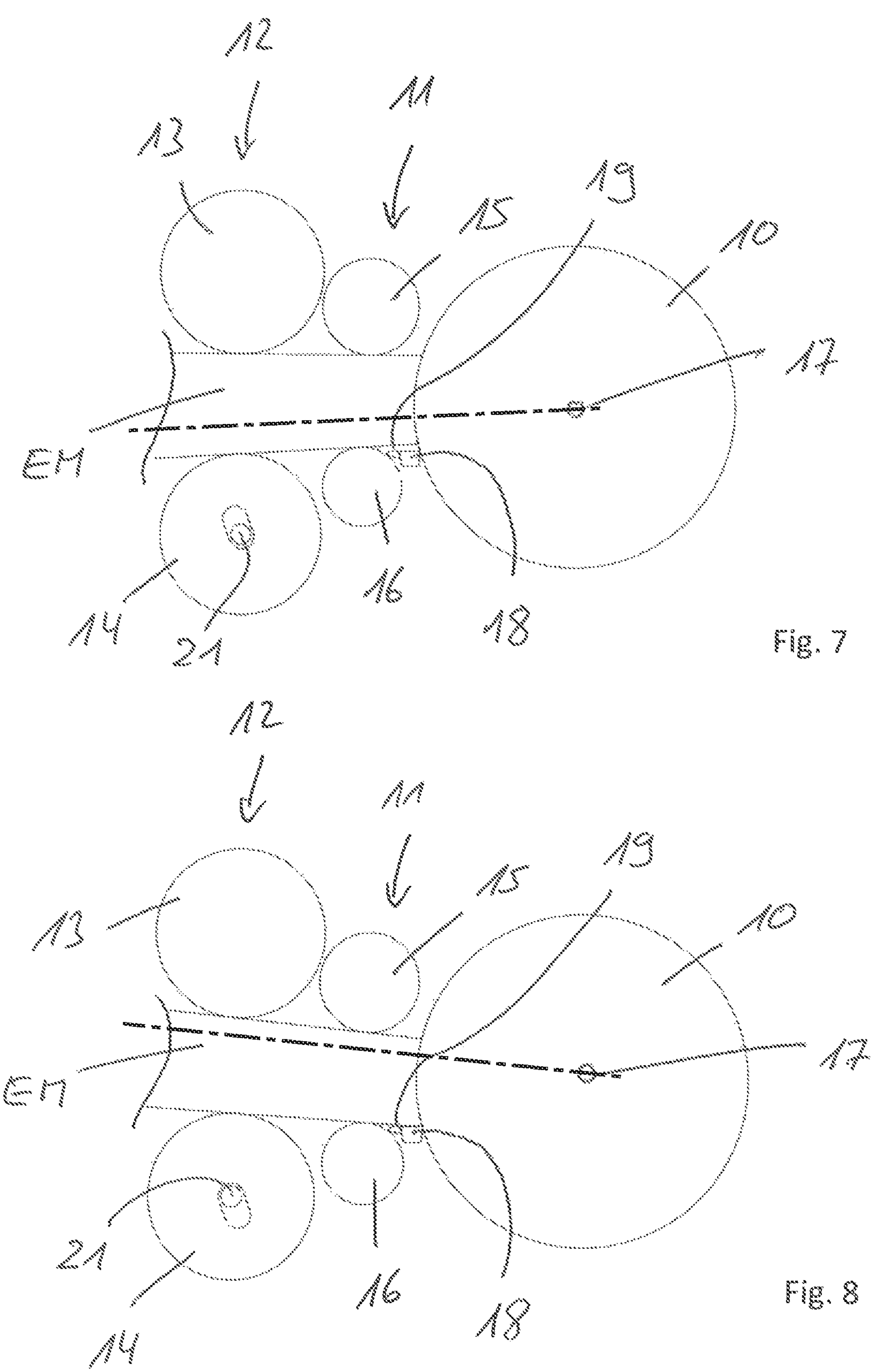
FIGS. 7, 8 show schematic views of a further modification of the chopping unit according to the invention of FIG. 2 in two different states.

In the variant of FIGS. 7 and 8, the position of the rotary shaft of the lower press roller 16 is unchangeable, but the rotary shaft 21 of the transport roller 14 can be displaced in its relative position to the rotary shaft 17 of the chopping drum 10 at least in the vertical direction and preferably also in the horizontal direction.

In FIGS. 5 and 6 both the counter-cutting device 18 and the stripper device 19 can both be displaced in turn together with the lower press roller 16 relative to the chopping drum 10. The same applies to the stop of the upper press roller 15, not shown in FIGS. 3, 4 and FIGS. 5, 6, which then can also be displaced in turn together with the lower press roller 16 relative to the rotary shaft 17 of the chopping drum 10.

By means of the invention, it is accordingly possible to displace the rotary shaft 20 of the lower press roller 16 and/or the rotary shaft 21 of one respective transport roller 14 in its relative position to the rotary shaft 17 of the chopping drum 10 at least in the vertical direction and preferably also in the horizontal direction.

The division of the mat height PH of the harvested crop mat EM into the portion AO arranged above the central point or the rotary shaft 17 of the chopping drum 10 and the portion AU arranged below the central point or the rotary shaft 17 of the chopping drum 10 can be actively influenced by means of the invention. As a result, both the throughput through the chopping unit 5 and the chopping quality which can be achieved or provided by the chopping unit 5 can ultimately be influenced.

In each embodiment of the invention, devices can be provided in order to set the spacing of the counter-cutting device 17 and/or the spacing of any stripper device 19 from the chopping drum 10 or from the lower press roller 16 to a desired level.

The agricultural harvesting machine 1 has a control device 32 for the chopping unit 5 which is designed to displace automatically the rotary shaft 20 of the lower press roller 16 and/or the rotary shaft 21 of the respective transport roller 14 in its relative position to the rotary shaft 17 of the chopping drum 10 at least in the vertical direction and preferably also in the horizontal direction as a function of the operating conditions of the chopping unit 5 and thus as a function of the operating conditions of the agricultural harvesting machine 1.

The invention also relates to such a control device 32 of the agricultural harvesting machine 1.

Thus the control device 32 of the agricultural harvesting machine 1, namely the forage harvester, is designed to displace automatically the rotary shaft 20 of the lower press roller 16 and/or the rotary shaft 21 of the respective transport roller 14 as a function of the mat height PH of the harvested crop mat EM and/or as a function of a pretensioning force of the respective roller pair 11, 12 and/or as a function of a torque of a drive motor 33 which serves for driving the chopping unit 5.

Thus as a function of the mat height PH, the rotary shaft 20 of the lower press roller 16 and/or the rotary shaft 21 of the transport roller 14 can be displaced in a path-controlled and/or angle-controlled manner.

If a high throughput through the chopping unit 5 is intended to be ensured, for example, in the case of a high mat height PH of the harvested crop mat EM it can be provided to lower the rotary shaft 20 of the lower press roller 16 and/or the rotary shaft 21 of the transport roller 14 to a greater extent than in the case of a lower mat height PH.

However, if a particularly high chopping quality is intended to be provided, in the case of a high mat height PH, in particular, the lower press roller 16 is lowered only to a relatively small degree.

The displacement of the rotary shaft 20 of the lower press roller 16 and/or the rotary shaft 21 of the transport roller 14 as a function of the mat height PH can take place as a function of a desired throughput through the chopping unit 5 and/or as a function of a desired chopping quality, as a function of the characteristic map or characteristic curve and/or namely as a function of at least one characteristic map stored in the control device 32 or characteristic curve stored in the control device 32.

Alternatively or additionally, the displacement of the rotary shafts 20, 21 of the lower press roller 16 and the transport roller 14 can also take place in a force-controlled manner or torque-controlled manner, and namely force-controlled as a function of the pretensioning force of the respective roller pair 11, 12 and torque-controlled as a function of the drive torque of the roller pairs 11, 12.

To this end, according to the desired throughput or chopping quality, corresponding characteristic curves or characteristic maps can be stored in the control device 32 as a function of the pretensioning force of the respective roller pair 11, 12 and/or as a function of the drive torque of the roller pairs 11, 12, the rotary shaft 20 of the lower press roller 16 and/or the rotary shaft 21 of the respective pre-compression roller 14 being able to be automatically displaced relative to the rotary shaft 17 of the chopping drum 10 as a function thereof.

The invention further relates to a method for operating the above-described chopping unit 5, wherein in the method according to the invention the rotary shaft 20 of the lower press roller 16 and/or the rotary shaft 21 of the transport roller 14 is displaced automatically in its relative position to the rotary shaft 17 of the chopping drum 10 as a function of the operating conditions of the chopping unit 5 at least in the vertical direction and preferably also in the horizontal direction, preferably as a function of the mat height PH and/or as a function of the pretensioning force of the respective roller pair 11, 12 and/or as a function of the drive torque of the roller pairs 11, 12.

LIST OF REFERENCE SIGNS

1 Agricultural harvesting machine
2 Working assembly
3 Attachment/maize header
4 Feed unit
5 Chopping unit
6 Mowing and conveying member
7 Feed drum
8 Conveying device
9 Discharge chute
10 Chopping drum
11 Roller pair
12 Roller pair
13 Pre-compression roller
14 Transport roller
15 Upper press roller
16 Lower press roller

17 Rotary shaft/central point
18 Counter-cutting device
19 Stripper device
20 Rotary shaft
21 Rotary shaft
22 Actuator
23 Actuator
24 Slot
25 Slot
26 Actuator
27 Actuator
28 Support arm
29 Stop
30 Counter-stop
31 Lever
32 Control device
33 Drive motor

The invention claimed is:

1. A chopping unit (5) of an agricultural harvesting machine (1) comprising, a chopping drum (10) bearing chopping knives, a first roller pair (11) consisting of an upper press roller (15) and a lower press roller (16) positioned upstream of the chopping drum (10) when viewed in the transport direction of the harvested crops, at least one second roller pair (12) consisting of a pre-compression roller (13) and a transport roller (14) positioned upstream of the first roller pair (11) when viewed in the transport direction of the harvested crops, and a counter-cutting device (18) cooperating with the chopping drum (10) and a stripper device (19) cooperating with the lower press roller (16), which are arranged between the lower press roller (16) and the chopping drum (10), characterized in that a rotary shaft (20) of the lower press roller (16) and/or a rotary shaft (21) of the transport roller (14) can be displaced in its relative position to a rotary shaft (17) of the chopping drum (10) at least in the vertical direction; and wherein the lower press roller (16), the stripper device (19) and the counter-cutting device (18) are fastened to a common support arm (28).

2. The chopping unit according to claim 1, characterized in that the stripper device (19) can be displaced together with the lower press roller (16) relative to the chopping drum (10).

3. The chopping unit according to claim 1, characterized in that the counter-cutting device (18) can be displaced together with the lower press roller (16) relative to the chopping drum (10).

4. The chopping unit according to claim 1, characterized in that a stop (29) for the upper press roller (15) can be displaced together with the lower press roller (16) relative to the chopping drum (10).

5. The chopping unit according to claim 1, characterized in that a stop for the respective pre-compression roller (13) can be displaced together with the respective transport roller (14) relative to the chopping drum (10).

6. The chopping unit according to claim 1, characterized in that the rotary shaft (20) of the lower press roller (16) and/or the rotary shaft (21) of the transport roller (14) can be displaced in its relative position to the rotary shaft (17) of the chop-ping drum (10) in the vertical direction perpendicular to the transport direction of the harvested crops and in the horizontal direction parallel to the transport direction of the harvested crops.

7. A control device (32) of an agricultural harvesting machine (1) having a chopping unit (5) according to claim 1, characterized in that said control device is designed to displace automatically the rotary shaft (20) of the lower press roller (16) and/or the rotary shaft (21) of the transport roller (14) in its relative position to the rotary shaft (17) of the chopping drum (10) as a function of the operating conditions of the chopping unit (5).

8. A chopping unit (5) of an agricultural harvesting machine (1) comprising, a chopping drum (10) bearing chopping knives, a first roller pair (11) consisting of an upper press roller (15) and a lower press roller (16) positioned upstream of the chopping drum (10) when viewed in the transport direction of the harvested crops, at least one second roller pair (12) consisting of a pre-compression roller (13) and a transport roller (14) positioned upstream of the first roller pair (11) when viewed in the transport direction of the harvested crops, and a counter-cutting device (18) cooperating with the chopping drum (10) and a stripper device (19) cooperating with the lower press roller (16), which are arranged between the lower press roller (16) and the chopping drum (10), characterized in that a rotary shaft (20) of the lower press roller (16) and/or a rotary shaft (21) of the transport roller (14) can be displaced in its relative position to a rotary shaft (17) of the chopping drum (10) at least in the vertical direction; and wherein the upper press roller (15) and the lower press roller (16) of the first roller pair (11) and the pre-compression roller (13) and a transport roller (14) of the second roller pair are movable relative to the chopping drum.

9. The chopping unit (5) of an agricultural harvesting machine (1) according to claim 8, further comprising a common support arm (28) that has the lower press roller (16), the stripper device (19) and the counter-cutting device (18) attached thereto.

* * * * *